United States Patent [19]

Grimes

[11] 4,377,445
[45] Mar. 22, 1983

[54] SHUNT CURRENT ELIMINATION FOR SERIES CONNECTED CELLS

[75] Inventor: Patrick G. Grimes, Westfield, N.J.

[73] Assignee: Exxon Research and Engineering Co., Florham Park, N.J.

[21] Appl. No.: 204,852

[22] Filed: Nov. 7, 1980

[51] Int. Cl.³ .................... C25B 15/06; C25B 15/08; H01M 8/04; H01M 6/30

[52] U.S. Cl. ................................ 204/1 R; 204/98; 204/228; 204/237; 204/255; 204/257; 204/268; 204/269; 310/11; 429/14; 429/18; 429/111; 429/70; 429/51

[58] Field of Search ........ 204/1 R, 98, 228, 253–258, 204/237, 267–270; 429/18, 111, 14–15, 50–51, 70, 119; 310/11

[56] References Cited

U.S. PATENT DOCUMENTS

| | | | |
|---|---|---|---|
| 3,522,098 | 7/1970 | Sturm et al. | 429/18 |
| 3,537,904 | 11/1970 | Matsuda et al. | 429/18 |
| 3,755,108 | 8/1973 | Raetzsch et al. | 204/255 X |
| 3,807,903 | 4/1974 | Gelfgat et al. | 310/11 X |
| 3,909,368 | 9/1975 | Raymond et al. | 204/228 X |
| 3,940,639 | 2/1976 | Enos et al. | 310/11 |
| 3,990,961 | 11/1976 | Raetzsch et al. | 204/255 |
| 4,049,878 | 9/1977 | Lindstrom | 429/18 |
| 4,081,585 | 3/1978 | Jacquelin | 429/15 |
| 4,277,317 | 7/1981 | Grimes et al. | 204/228 X |

FOREIGN PATENT DOCUMENTS 2556065 6/1976 Fed. Rep. of Germany ...... 204/253

Primary Examiner—Donald R. Valentine
Attorney, Agent, or Firm—Robert S. Salzman

[57] ABSTRACT

Electrochemical systems having a plurality of cells which are hydraulically and electrically connected in series develop shunt currents in the electrolyte of adjacent cells. The shunt currents are reduced or eliminated by the placing of an electrical bypass across two adjacent intercell conduits, and applying a protective current through the electrical bypass in a direction of the shunt currents and of a magnitude that can effectively reduce the shunt currents.

41 Claims, 9 Drawing Figures

SHUNT CURRENT ELIMINATION FOR SERIES CONNECTED CELLS

RELATED PATENTS AND PATENT APPLICATION

The subject invention is related to U.S. Pat. No. 4,197,169, entitled: SHUNT CURRENT ELIMINATION AND DEVICE, issued Apr. 8, 1980, and to copending U.S. patent applications, Ser. Nos. 97,194; 122,193; 122,706; and 144,679, respectively filed on Nov. 26, 1979; Feb. 19, 1980; Feb. 19, 1980; and Apr. 28, 1980; all are assigned to a common assignee.

The teachings of these inventions are meant to be incorporated herein by way of reference.

FIELD OF THE INVENTION

This invention relates to a method and apparatus for the elimination of shunt currents in electrochemical systems having a plurality of cells connected in series electrically and hydraulically.

BACKGROUND OF THE INVENTION

The phenomenon of shunt currents is well known and occurs in electrically connected series cells. Shunt currents are a result of conductive paths through the electrolyte shared by adjacent groups of cells of the system.

The elimination of shunt currents has been recently described with respect to systems having a plurality of cells that are electrically connected in series and hydraulically connected in parallel. The shunt currents in such systems can be effectively eliminated or reduced by passing a protective current through a common manifold of the system, in a direction the same as the shunt currents and of a proper magnitude to effect elimination. The above teaching is the subject of U.S. Pat. No. 4,197,169, entitled: Shunt Current Elimination and Device; issued: Apr. 8, 1980; inventors: Markus Zahn, Patrick G. Grimes, and Richard J. Bellows.

Some of the teachings of this patent apply to the present invention and inasmuch as they provide an understanding, are meant to be incorporated herein by way of reference.

The invention for which Letters Patent is presently sought involves the elimination and/or reduction of shunt currents in electrochemical systems having a hydraulic series configuration, i.e. electrochemical systems wherein the cells are hydraulically connected at least in part in series, and do not necessarily enjoy the convenience of a common electrolyte-carrying manifold.

Such configured systems have severe shunt current effects. Shunt currents in such systems are not easily eliminated due to the lack of commonality of the hydraulic pathways.

BRIEF SUMMARY OF THE INVENTION

The invention pertains to a method and device for eliminating and/or reducing shunt currents in electrochemical systems having a plurality of cells that are electrically connected at least in part in series, and are hydraulically connected at least in part in series.

Hydraulic series connected cells have shared electrolyte in the intercell conduits connecting adjacent cells. Such shared electrolyte gives rise to electrical electrolytic pathways between the adjacent cells, which paths allow shunt currents therebetween.

The electrochemical systems of this invention have at least two adjacent intercell conduits, which are inventively connected by an electrical bypass. Shunt currents which are created in the shared electrolyte of these intercell conduits is effectively reduced by passing a protective current through the electrical bypass in a direction the same as the shunt currents and of a magnitude which will reduce, if not eliminate them.

The electrical bypass may be in the form of an electrical conductor or a porous, electrolytically conductive electrolyte-carrying plug disposed or connected across the adjacent intercell conduits.

For purposes of this invention, the term shared electrolyte shall mean that portion of the electrolyte contained in an area of commonality to the adjacent cells; the electrolyte being a physical continuum between such cells.

The electrochemical systems of this invention may be those wherein the electrolyte is static within the system or is circulated through the system, as shown in the U.S. patent to Venero, No. 4,105,829.

As used herein the term "electrochemical devices" or "electrochemical systems" shall be meant to include but not limited to photoelectrochemical devices such as water photolysis cell devices, photogalvanic cell devices, liquid solar cell devices and to include other electrochemical devices such as batteries, fuel cell devices, chloralkali cell devices, metal-air devices, sea water batteries, electrolyzers, electrochemical synthesizers, and electrowinning devices, as well as other devices employing cathodes, anodes, electrodes and common electrolytes, ionic conductors and plasmas including bipolar and monopolar multicell devices, and including devices having a plurality of electrolytes (e.g. catholytes and anolytes).

It is an object of the invention to provide an improved method and device for shunt current elimination and/or reduction in electrochemical systems having a plurality of cells that are electrically and hydraulically connected in series;

It is another object of this invention to provide a method and device for shunt current elimination in hydraulically series connected cells of an electrochemical system, wherein an electrical bypass is provided between adjacent intercell conduits, and a protective current is applied thereto.

These and other objects of the invention will be better understood and will become more apparent with reference to the following detailed description considered in conjunction with the accompanying drawings briefly described below:

DETAILED DESCRIPTION OF THE INVENTION

Figure 1:
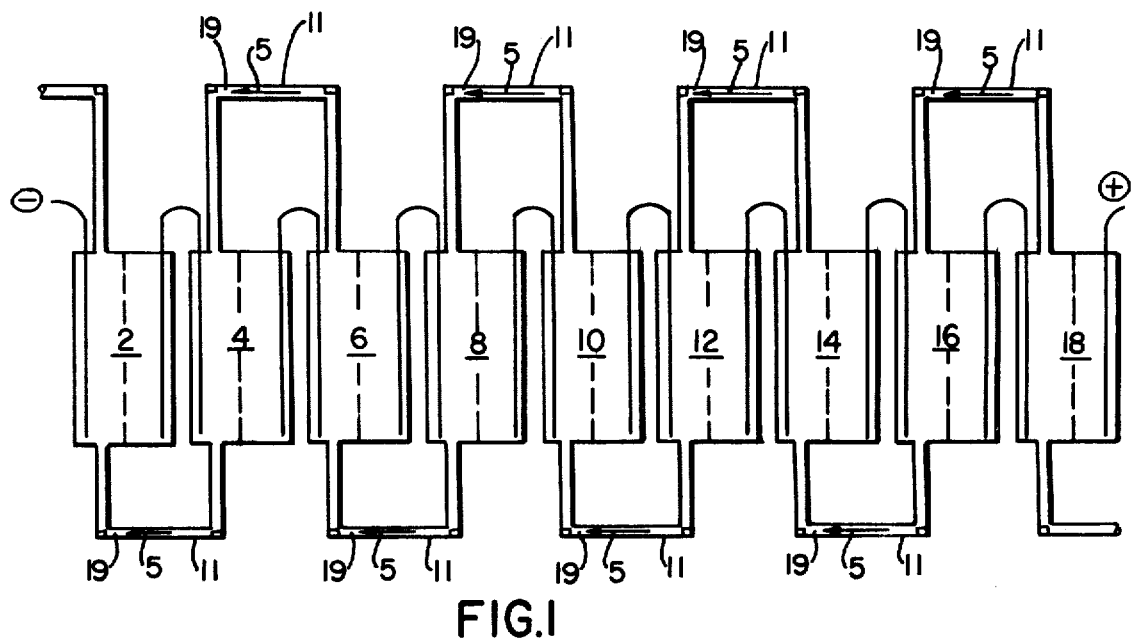
FIG. 1 illustrates in schematic form a typical monopolar electrochemical system of the type having a plurality of cells hydraulically connected in series and which generates shunt currents.
Figure 2:
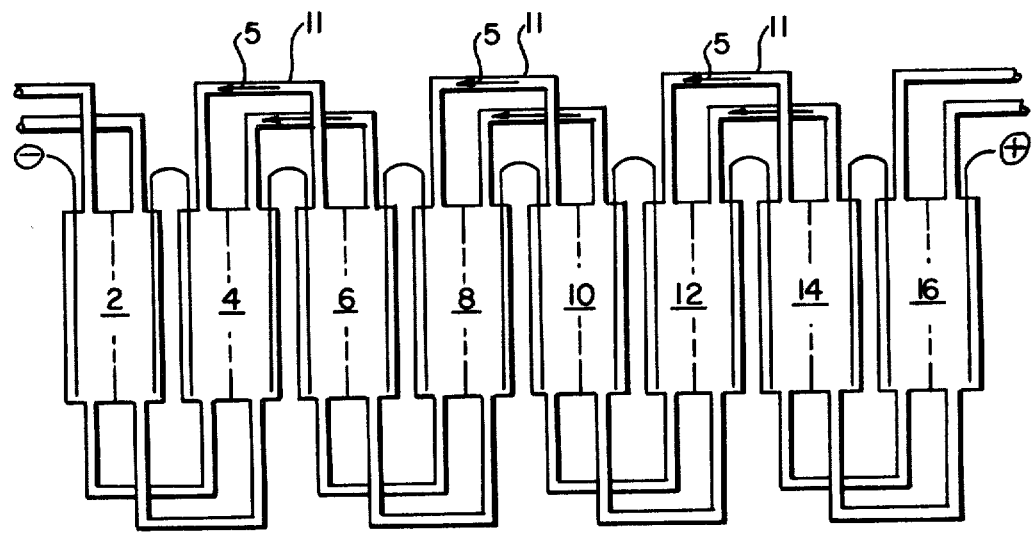
FIG. 2 is a schematic view of a typical bipolar electrochemical system of the type having a plurality of cells hydraulically connected in series and which generates shunt currents.
Figure 2A:
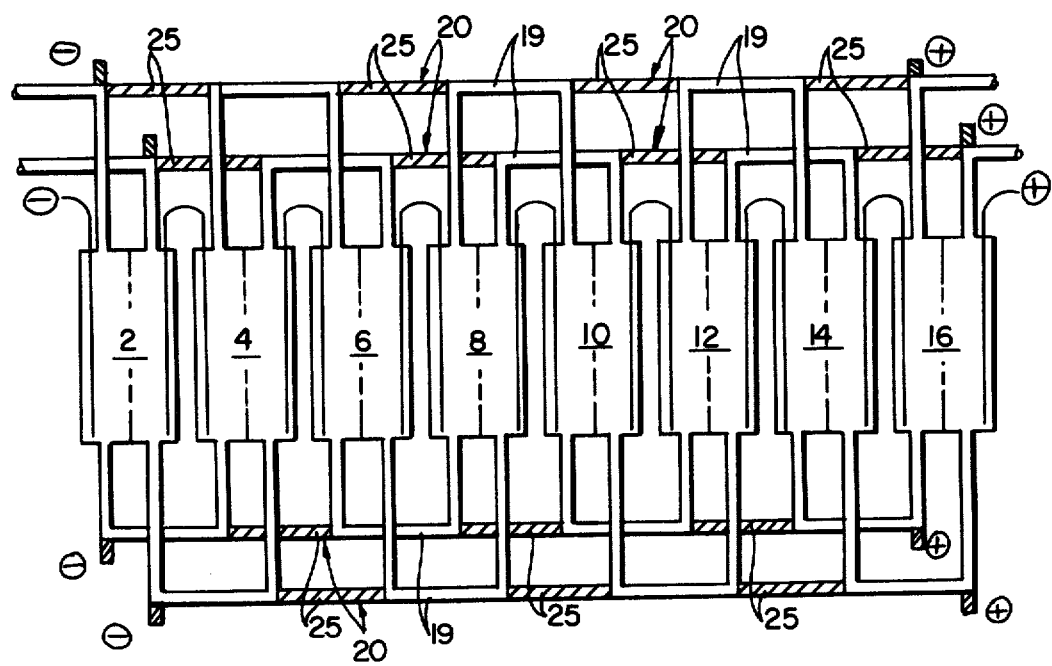
FIG. 2a is a schematic view of the invention as applied to the bipolar system of FIG. 2.

Generally speaking, respective monopolar and bipolar electrically connected battery systems as typically shown in FIGS. 1 and 2, will develop shunt currents (arros 5) in the electrolyte of the intercell conduits 11 between the cells 2, 4, 5, 8, 10, etc. The electrolyte shared by adjacent cells 2;4, 4;6, and 6;8 etc. respectively, disposed in the interconnecting conduits 11, gives rise to shunt currents between each cell pair.

If an electrical bypass 20 (FIGS. 1a-1d and 2d) is placed across the intercell conduits 11 of the hydraulic series connected systems, and the appropriate protective currents are passed across the electrical bypass 20, shunt currents can be reduced or eliminated. These protective currents are applied in the direction of the resulting shunt currents and are of sufficient magnitude to reduce or null the shunt currents. These protective currents pass through the alternate regions of electrolyte 19 and electrical bypass connectors 20 (FIGS. 1a-1d and 2d). The electrical bypass connector 20 may be an electrolyte-containing porous plug 25, as shown in FIGS. 1d or 2d, which plugs 25 are fluidically connected across respective adjacent intercell conduits 11, and which allow ions to pass therethrough, but which restrict electrolyte flow. Membranes (not shown) can also serve a similar purpose.

Figure 1A:
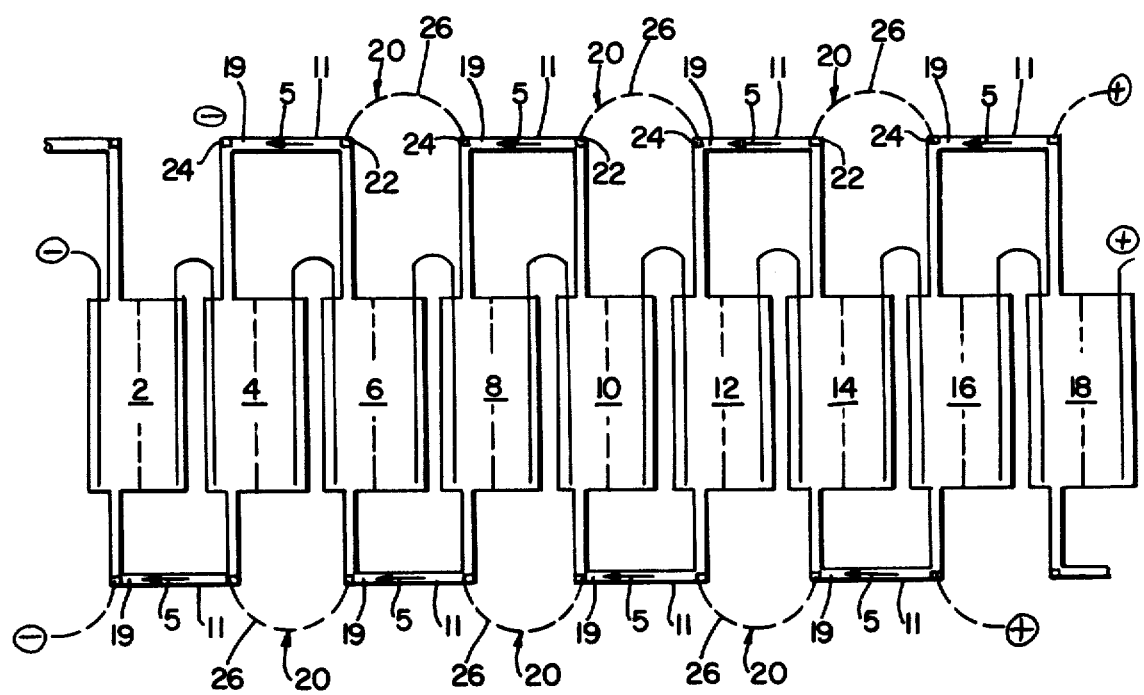
FIGS. 1a through 1d are alternate embodiments of the invention, showing in schematic form various ways of arranging for an electrical bypass with protective current being applied thereto.
Figure 1B:
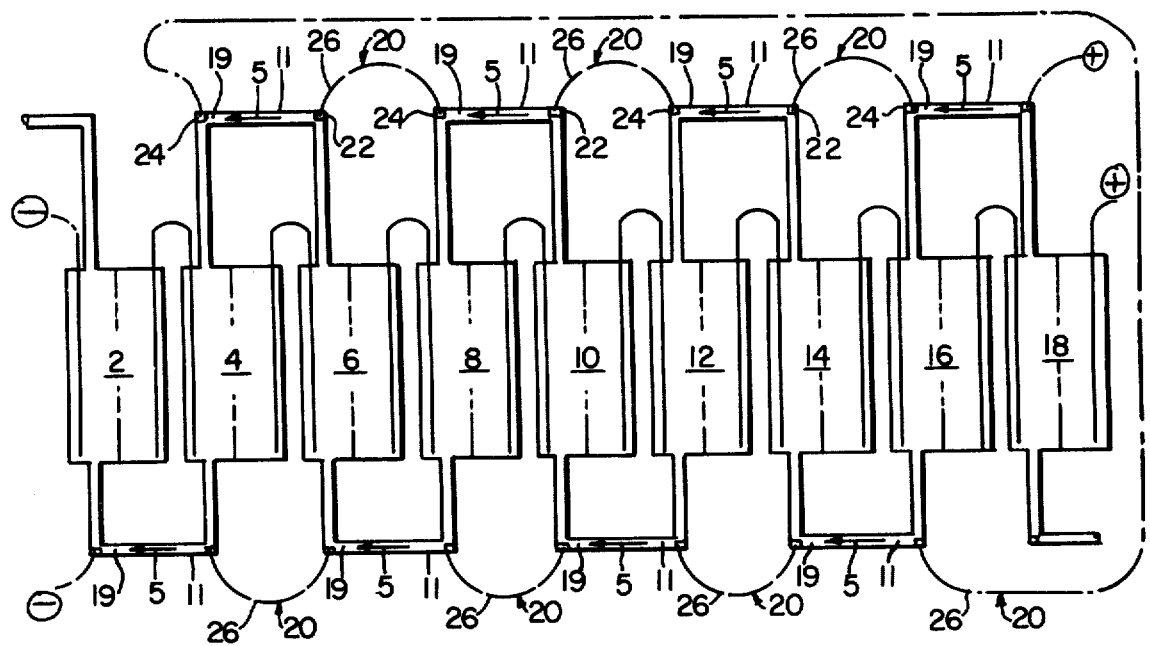
Figure 1C:
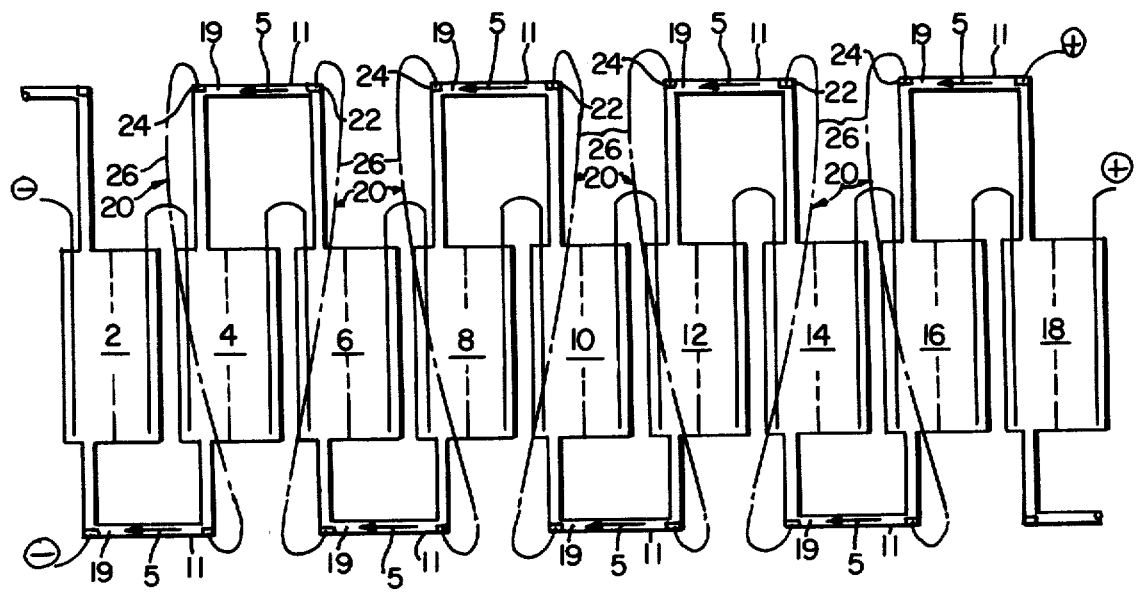
Figure 1D:
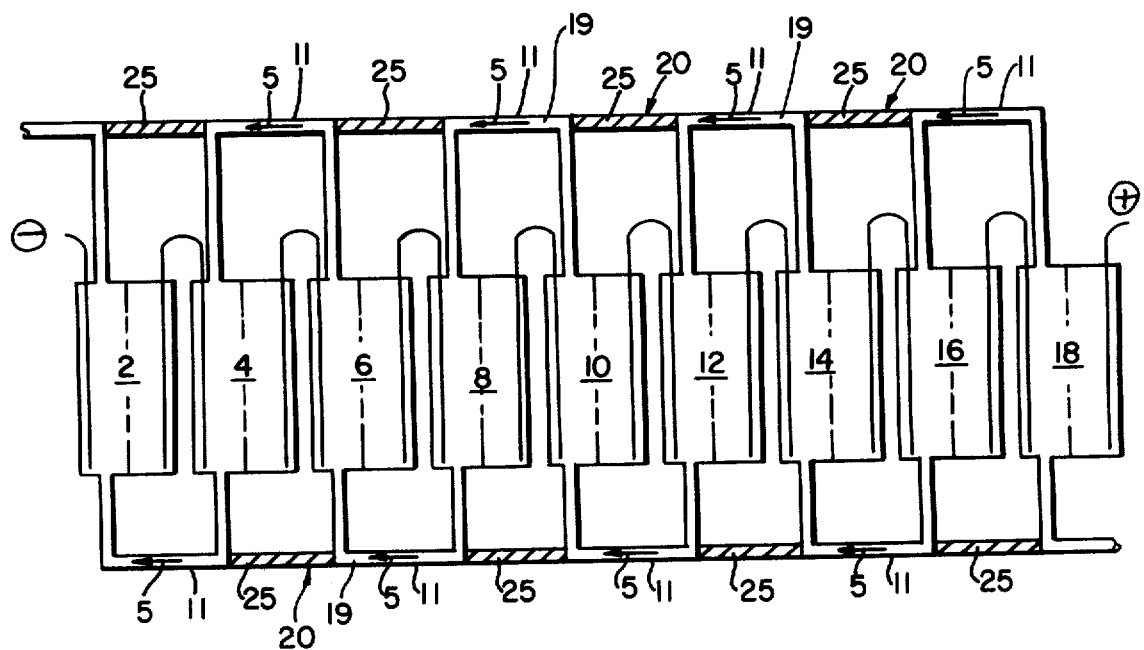

The electrical bypass 20 can also be an electrical conductor 26 to which current is directly applied via electrodes 22 and 24 (typical), as shown in FIGS. 1a through 1c. FIGS. 1a and 1c illustrate alternate ways to electrically connect the bypass conductors 20. Redox reactions will occur at the points of contact between the electrodes 22 and 24 and the (typical) electrolyte in the intercell conduits 11.

Figure 4:
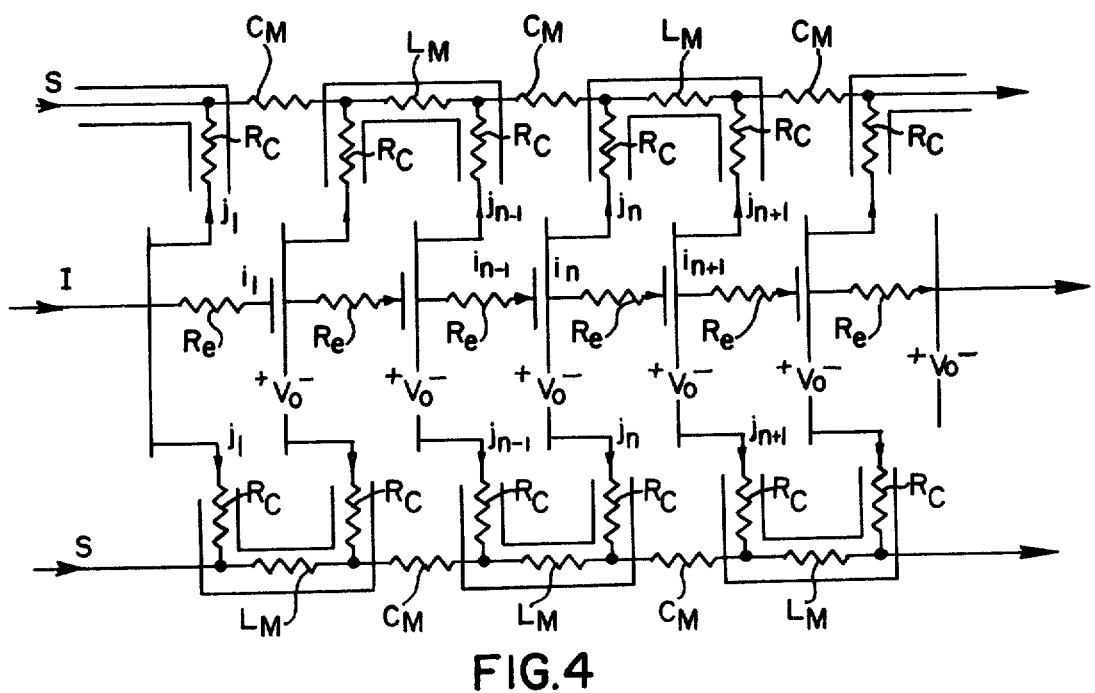
FIG. 4 is an electrical analogue of the electrochemical system shown in FIG. 1.

The voltage drop through the electrolyte in the intercell conduits 11 should approximate or equal the voltage of the cell beneath it, which is $V_o + IR_e$, wherein $V_o$ is the open circuit cell voltage, $I$ is the current, and $R_e$ is the effective internal resistance of each cell. Reference should be made to the electrical circuit of FIG. 4, which is the analogue of the battery system of FIG. 1.

The resistance through each intercell conduit 11 is given as $L_m$, such that the current $S_m$ in each conduit is:

$$S_m = (V_o + IR_e)/L_m$$

The same current passes through the electrical bypass 20, whose resistance is given as $C_m$, such that the current $V_c$ through the bypass 20 is:

$$V_c = S_m C_m$$

The current across the entire system of FIG. 1, from electrodes 28 to 30 is then (with N even) given as:

$$\frac{N-1}{2}(V_o + IR_e) + \frac{N-1}{2} V_c =$$

$$S_m\left(\frac{N-1}{2} L_m + \frac{N-1}{2} C_m\right) \text{ if}$$

$$C_m = L_m \quad V_o + IR_e = V_c$$

$$(N-1)(V_o + IRe) + (N-1)V_e = S_m(N-1)L_m + (N-1)S_m C_m$$

$$S_m = \frac{N-1(V_o + IR_e) + (N-1)V_e}{(N-1)L_n + (N-1)C_m} =$$

$$\frac{2(N-1)(V_o + IR_e)}{2(N-1)(L_m)} = \frac{V_o + IR_e}{L_m} \text{ or}$$

$$(N-1)(V_o + IR_e) = S(N-1)(L_m)$$

This is the same condition for the electrically series connected cells with parallel hydraulic connections as shown in aforementioned U.S. Pat. No. 4,197,169. Therefore, the power requirements will be the same for either system configuration.

The power requirements for hydraulically series connected systems may be reduced by making $C_m$ less resistive than $L_m$ by using electronic conductors as short paths for $C_m$. Power requirements may thus be reduced by as much as one-half.

Figure 3:
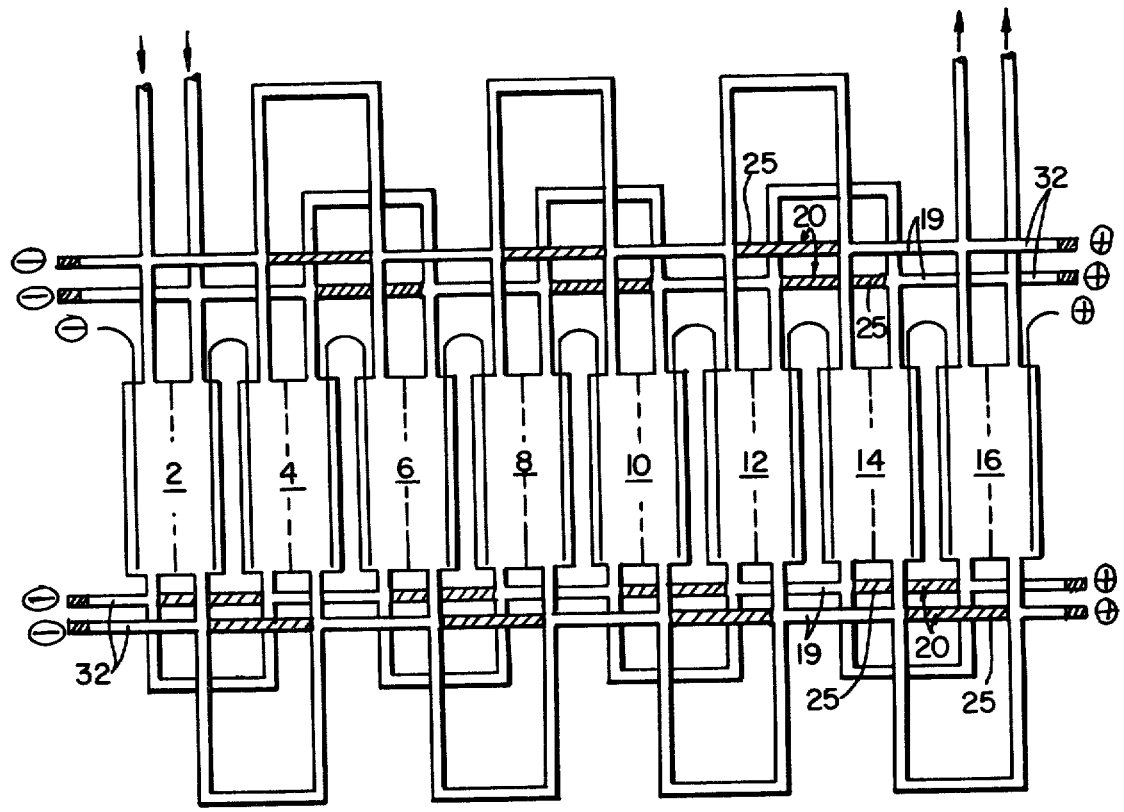
FIG. 3 is a schematic diagram of the electrochemical system of FIG. 2 utilizing another embodiment of the invention.

The protective scheme of this invention may also be extended to the system configuration using tunnels 32 as depicted in FIG. 3, and as previously described in U.S. patent application Ser. No. 97,194.

There can be two methods of shunt conduction: through the electrolyte in the conduit, or additionally through the conduit walls (if they are conductors).

Modern practice uses a plastic pipe conduit walls. Older practice has sometimes used metal pipes with or without glass interruptors to increase the resistance.

The foregoing teachings can be applied to either case. Also, the aforementioned teachings can apply to a system comprising of multiple sets of cells, each set having cells connected hydraulically in parallel, with each set connected hydraulically in series.

The foregoing may include devices such as a magnetohydrodynamic device wherein the electrolyte is a hot gas plasma ionic conductor. For purposes of definition, therefore, electrolyte is herein meant to include plasmas.

Having thus described this invention, what is desired to be protected by Letters Patent is presented in the following appended claims.

What is claimed is:

1. A method of minimizing shunt currents in an electrochemical device having a plurality of cells connected at least in part electrically and at least in part hydraulically in series, adjacent series cells of said device sharing electrolyte in respective hydraulically connected intercell conduits whereby electrical electrolytic conductive shunt current pathways are created in said electrolyte of said respective intercell conduits, said method comprising the steps of:
   (a) forming an electrical bypass across at least two adjacent intercell conduits; and
   (b) applying a protective current across said electrical bypass in a direction which is the same as the shunt currents through the intercell conduits and of a magnitude which can effectively reduce said shunt currents.

2. The method of claim 1 wherein said protective current is applied through said electrical bypass to reduce shunt currents in a static electrolyte electrochemical device.

3. The method of claim 1 wherein said protective current is applied through said electrical bypass in a circulating electrolyte electrochemical device.

4. The method of claim 1 wherein said electrochemical device has a plurality of cells all of which are electrically connected in series.

5. The method of claim 1 wherein said electrochemical device has a plurality of cells all of which are hydraulically connected in series.

6. The method of claim 5 wherein said protective current is applied through said electrical bypass to reduce shunt currents in a static electrolyte electrochemical device.

7. The method of claim 5 wherein said protective current is applied through said electrical bypass in a circulating electrolyte electrochemical device.

8. The method of claim 1, wherein all of said intercell conduits are electrically connected to form an electrical manifold across said cells.

9. The method of claim 1 wherein said electrochemical device is a photoelectrochemical device.

10. The method of claim 1 wherein said electrochemical device is a battery or sets of batteries.

11. The method of claim 1 wherein said electrochemical device is a fuel cell device.

12. The method of claim 1 wherein said electrochemical device is a chlor-alkali cell device.

13. The method of claim 1 wherein said electochemical device is an electrowinning device.

14. The method of claim 1 wherein said electrochemical device is an electrolyzer.

15. The method of claim 1 wherein said electrochemical device is a magnetohydrodynamic generator.

16. The method of claim 1 wherein said electrochemical device has a plurality of electrolytes.

17. The method of claim 1 wherein said electrochemical device has bipolar cells.

18. The method of claim 1 wherein said electrochemical device has monopolar cells.

19. The method of claim 1 wherein said electrochemical device has a monopolar and bipolar configuration of cells.

20. An electrochemical device comprising:
  (a) a plurality of cells connected electrically at least in part in series and hydraulically at least in part in series;
  (b) at least two adjacent intercell conduits, each of which is connected across two adjacent cells, and each of which contains electrolyte shared by the adjacent cells such that an electrical electrolytic conductive path is created between said adjacently connected cells, said path capable of resulting in undesirable shunt currents;
  (c) means forming an electrical bypass across at least two adjacent intercell conduits; and
  (d) means for applying protective current across said electrical bypass in order to at least reduce said shunt currents.

21. The device of claim 20 wherein said electrolyte is static within said intercell conduits.

22. The device of claim 20 wherein said electrolyte is a circulating electrolyte within said intercell conduits.

23. The device of claim 20 wherein said plurality of cells are all connected electrically in series.

24. The device of claim 20 wherein said plurality of cells are all connected hydraulically in series.

25. The device of claim 24 wherein said electrolyte is static.

26. The device of claim 25 wherein said electrolyte is a circulating electrolyte.

27. The device of claim 26 wherein each intercell conduit is electrically connected to form an electrical manifold across said cells.

28. The device of claim 20 wherein said device is a photoelectrochemical device.

29. The device of claim 20 wherein said electrochemical device is a battery.

30. The device of claim 20 wherein said electrochemical device is a fuel cell device.

31. The device of claim 20 wherein said electrochemical device is a chlor-alkali cell device.

32. The device of claim 20 wherein said electrochemical device is an electrowinning device.

33. The device of claim 20 wherein said electrochemical device has a plurality of electrolytes.

34. The device of claim 20 wherein said electrochemical device is an electrolyzer.

35. The device of claim 20 wherein said electrochemical device is a magnetahydrodynamic generator.

36. The device of claim 20 wherein said electrochemical device has bipolar cells.

37. The device of claim 20 wherein said electrochemical device has monopolar cells.

38. The device of claim 20 wherein said electrochemical device has a monopolar and bipolar configuration of cells.

39. The device of claim 20 wherein said electrical bypass is an electrolyte-containing porous plug disposed between said intercell conduits.

40. The device of claim 20 wherein said electrical bypass is an electrical conductor disposed between said intercell conduits.

41. The device of claim 26 wherein said electrical bypass is a combination of electrical conductors and electrolyte-containing porous plugs disposed between said intercell conduits.

* * * * *